United States Patent [19]

Barinaga

[11] 4,090,390

[45] May 23, 1978

[54] FENCE CLIP TOOL

[76] Inventor: Pete Barinaga, 3416 Meadow Dr., Boise, Id. 83704

[21] Appl. No.: 728,278

[22] Filed: Sep. 30, 1976

[51] Int. Cl.[2] .......................... B21D 9/08; B23P 11/00

[52] U.S. Cl. .................................... 72/410; 29/243.56; 140/106

[58] Field of Search ................ 29/243.56, 243.58, 751, 29/758, 810, 816; 72/409, 410; 113/56; 140/11, 52, 56, 57, 105, 106; 7/1 Q, 4

[56] References Cited

U.S. PATENT DOCUMENTS

| | | | |
|---|---|---|---|
| 468,174 | 2/1892 | Goodrich | 72/410 |
| 619,710 | 2/1899 | Baldwin | 72/410 |
| 834,941 | 11/1906 | Staples | 29/243.56 |
| 1,722,279 | 7/1929 | Davis | 72/409 |
| 1,848,763 | 3/1932 | Baringer | 72/410 |
| 2,735,322 | 2/1956 | Meisler | 29/243.56 |

FOREIGN PATENT DOCUMENTS

| | | | |
|---|---|---|---|
| 324,657 | 1/1930 | United Kingdom | 7/1 Q |

*Primary Examiner*—E. M. Combs
*Attorney, Agent, or Firm*—Paul F. Horton

[57] ABSTRACT

The fence clip tool of the present invention comprises a fence clip channel-like housing assembly including a clip pocket defined by the housing side walls and a pair of opposing transverse upstanding walls and a pair of opposing arms having substantially arcuate transverse jaws at one of their respective terminal ends, the arms being axially mounted and journalled for rotation in the housing distally from the terminal ends of the housing.

3 Claims, 5 Drawing Figures

FENCE CLIP TOOL

FIELD OF INVENTION

This invention relates to fence clip tools and more particularly to a fence clip tool adapted to juxtaposition and affix fence clips for holding wire fencing to commonly known steel fence posts known in the art.

BRIEF DESCRIPTION OF THE PRIOR ART

Means for attaching wire fencing to fence posts generally comprise stapling the wire fencing to a post, providing a substantially U-shaped wire about a fence post and the wire fencing and providing fence wire hangers and clips on the fence post. Heretofore, such attaching means generally comprise various specially designed pliers for manual bending and attaching the wire with interfibrous fasteners to the fence posts. In cattle grazing areas it is desirable to release the wire fencing at selected points to permit passage of animals and vehicles. This is particularly true in vast grass lands where gates are not practical because of economic requirements. This has heretofore made it necessary to detach or deform wire fencing post engaging or attaching means and to replace the fencing after passage requiring much labor and time.

Accordingly it is an object of this invention to provide a fence clip tool including means to juxtaposition a fence clip to a fence post and means for attaching the same.

Another object of this invention is to provide means in a fence clip tool for deforming and opening a fence clip to release wire fencing.

These and other objects shall become apparent from the description following, it being understood that modifications may be made without affecting the teachings of the invention here set out.

SUMMARY OF THE INVENTION

The fence clip tool of the present invention comprises a fence clip channel-like housing assembly including a clip pocket defined by the housing side walls and a pair of opposing transverse upstanding walls and a pair of opposing arms having substantially arcuate transverse jaws at one of their respective terminal ends, the arms being axially mounted and journalled for rotation in the housing distally from the terminal ends of the housing.

The housing may be provided with magnet base plate suitably fastened to the bottom wall of the housing to hold a fence clip in the clip pocket until attachment to a fence post.

One of the arms may be provided with an upstanding pry bar operable to selectively adjust the wire fencing engaging portion.

A more clear and comprehensive understanding may be had from the detailed description of the preferred embodiment when read in connection with the drawings forming a part of this specification.

DESCRIPTION OF PREFERRED EMBODIMENT

Figure 1:
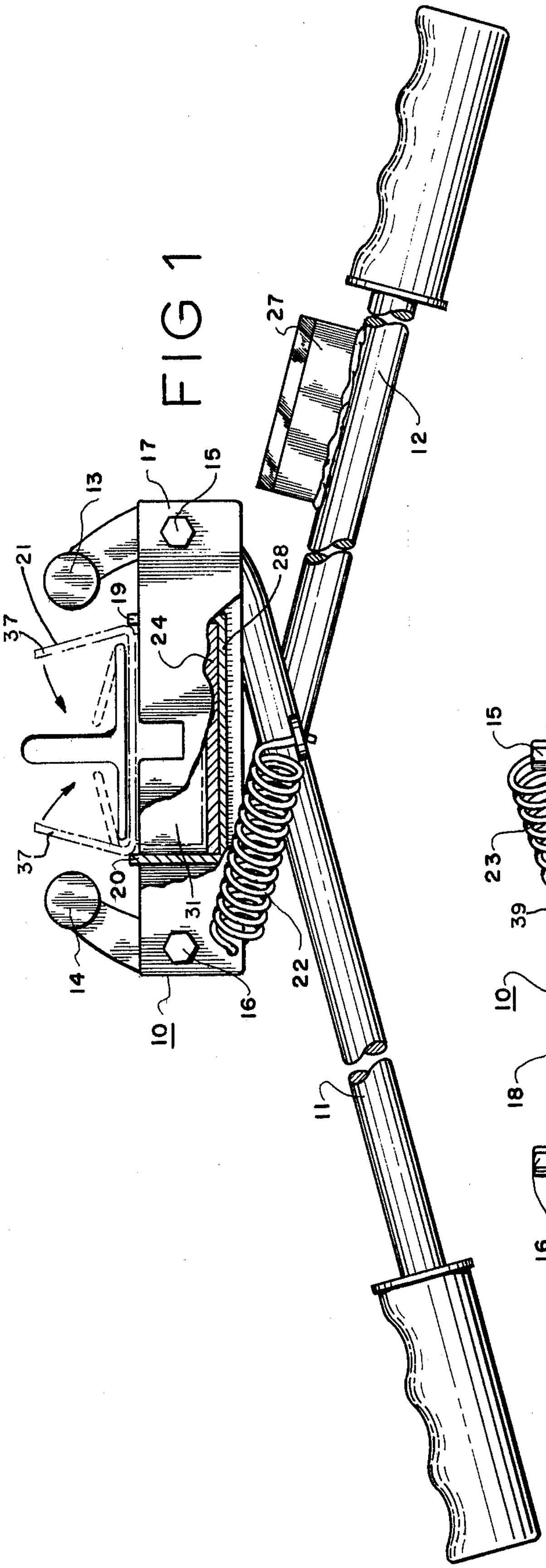
FIG. 1 is a side elevational view of the fence clip tool of the present invention including a fence clip in the tool for illustrative purposes and a portion of the housing broken away to more clearly show details of construction.
Figure 2:
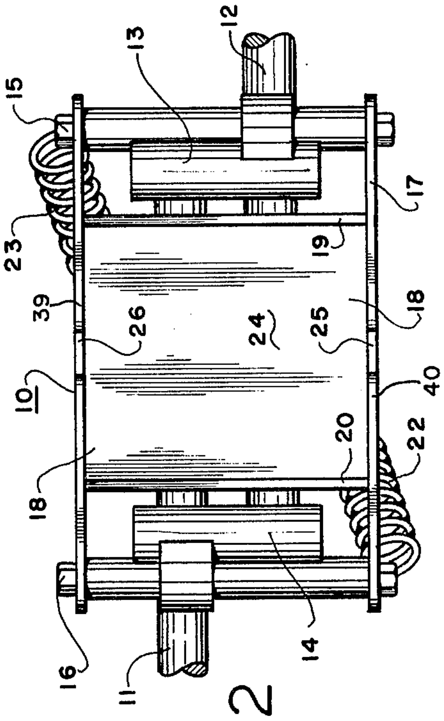
FIG. 2 is a top plan view of the housing of this invention.
Figure 4:
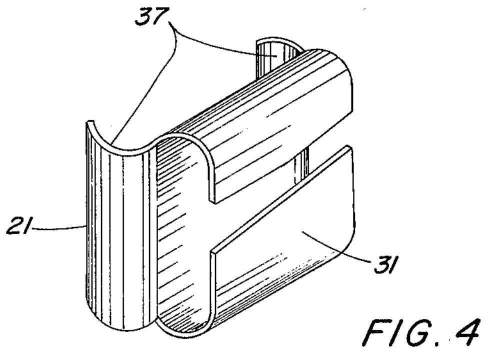
FIG. 4 is a perspective view of a fence clip upon which the tool of this invention acts.

Referring now to the drawings and more particularly to the FIG. 1, the fence clip tool of this invention is generally shown and identified by the numeral 10. The tool 10 includes a pair of opposing clamping arms 11 and 12 each having respective jaws 13 and 14 and being axially mounted by respective pin assemblies 15 and 16 in a substantially U-shaped housing 17. The housing 17 is provided with a fence clip pocket portion 18 defined by a pair of opposing upstanding walls 19 and 20; upper and lower walls 39 and 40 respectively, and bottom wall 28. The fence clip pocket portion 18 is adapted to receive a fence clip 21 more clearly shown in the FIG. 4 and more fully described in the patent application of Ronald Davison, Ser. No. 353,923, filed Apr. 23, 1973 and continuations thereof. In this manner the clip 21 may be juxtapositioned on a fence post for attachment thereto.

In practice it has been found to advantage to maintain the jaws 13 and 14 in a normally open position substantially as shown. Therefore respective springs 22 and 23 may be suitably attached on one of the respective ends to the arms 11 and 12 and their respective opposite ends to the housing 17.

To further facilitate juxtapositioning the clip, a magnet base plate 24 may be mounted to the bottom wall 28 of the housing 17 to hold a clip in the pocket portion 18 between the walls 19 and 20.

Figure 5:
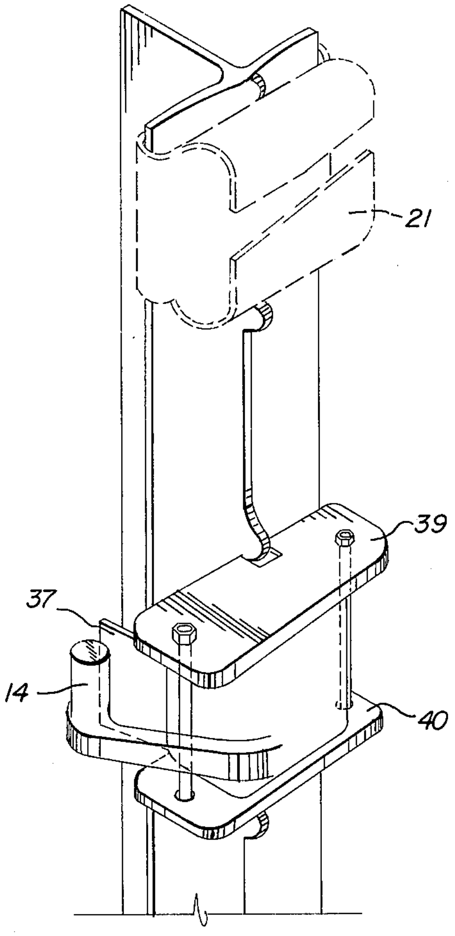
FIG. 5 is a perspective view showing a fence clip attached to a post and a partial view of the fence clip tool of the present invention in-position for attachment of a second clip.

The housing 17 is provided with a pair of opposing notches 25 and 26 to fit over projecting portions of commonly known steel fence posts, as seen to advantage in FIG. 5.

In operation, the wire engaging portion 31 of fence clip 21 is placed into the pocket 18 of device 10. The clip 21 engages the magnet base plate 24 and juxtapositions on a commonly known steel fence post. By manually pulling the arms 11 and 12 together the respective jaws 13 and 14 urge the post engaging legs 37 inwardly against the post to secure the clip thereto, as seen to advantage in FIG. 1.

Figure 3:
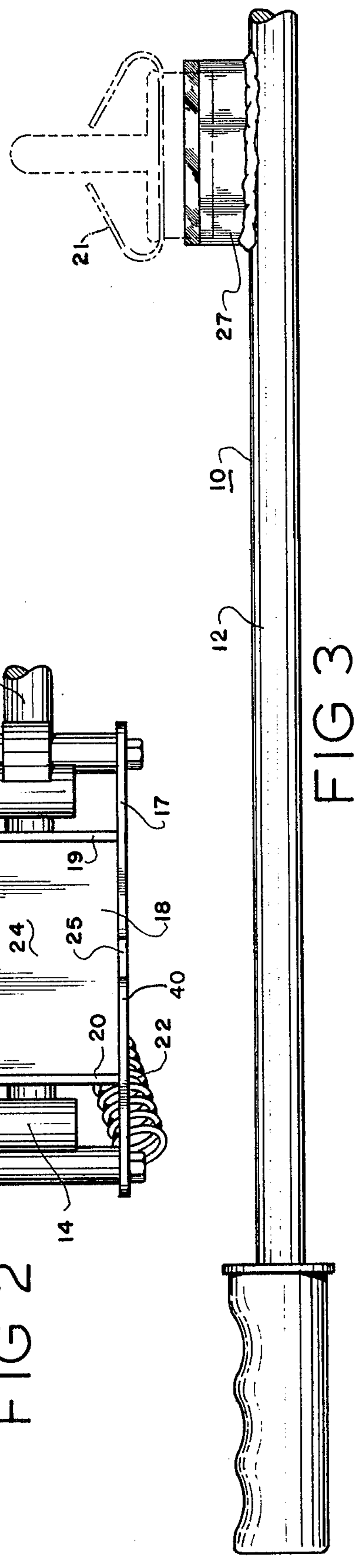
FIG. 3 is a side elevational view of the fence clip adjusting means of this invention.

Referring to the FIG. 3 an upstanding pry bar 27 may be suitably fastened to the arm 11. The bar 27 is used to adjust the wire engaging portion of the clip 21.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A fence clip tool comprising:

a fence clip housing including opposing upper and lower walls, a pair of opposing upstanding side walls transversely mounted to said upper and lower walls, and a bottom wall transversely mounted to said upper and lower walls and said side walls whereby a fence clip pocket, operable to hold a fence clip with its legs horizontally extending, is defined, said upper and lower walls each having an opposing notch substantially in the center thereof adapted to receive vertically spaced steel fence post projections; and a pair of opposing arms axially mounted and journaled for rotation in said housing, each of said arms having at its terminal end a cylindrical, transverse, jaw operable to engage an extending leg of a fence clip to bend the leg about a fence post, closure of said jaws being effected by actuating the ends of said arms opposite the jaws toward one another.

2. The apparatus of claim 1 including a magnet base plate suitably fastened to the bottom wall of the housing and being operable to selectively hold a fence clip in said clip pocket until attachment by the tool of the clip to a fence post.

3. The apparatus of claim 1 having an upstanding pry bar suitably fastened to the side of one of the arms parallel with said arm, said pry bar being operable to selectively adjust a fence clip wire fencing engaging portion.

* * * * *